(12) United States Patent
Tiana et al.

(10) Patent No.: US 10,001,376 B1
(45) Date of Patent: Jun. 19, 2018

(54) AIRCRAFT POSITION MONITORING SYSTEM AND METHOD

(71) Applicants: Carlo L. Tiana, Portland, OR (US); Sarah Barber, Cedar Rapids, IA (US)

(72) Inventors: Carlo L. Tiana, Portland, OR (US); Sarah Barber, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 252 days.

(21) Appl. No.: 14/626,073

(22) Filed: Feb. 19, 2015

(51) Int. Cl.
*G01C 21/00* (2006.01)
*B64D 43/00* (2006.01)
*B64D 47/08* (2006.01)
*G01C 21/20* (2006.01)

(52) U.S. Cl.
CPC ........... *G01C 21/005* (2013.01); *B64D 43/00* (2013.01); *B64D 47/08* (2013.01); *G01C 21/20* (2013.01)

(58) Field of Classification Search
CPC ...... G01C 21/005; G01C 21/20; B64D 43/00; B64D 47/08
See application file for complete search history.

(56) References Cited

U.S. PATENT DOCUMENTS

| | | | | |
|---|---|---|---|---|
| 5,072,396 A | * | 12/1991 | Fitzpatrick | G09B 9/24 348/116 |
| 5,136,297 A | * | 8/1992 | Lux | G01C 21/005 342/33 |
| 5,208,757 A | * | 5/1993 | Appriou | F41G 7/343 342/64 |
| 6,765,569 B2 | * | 7/2004 | Neumann | G06T 7/80 345/419 |
| 7,089,092 B1 | * | 8/2006 | Wood | G01S 19/15 342/33 |
| 7,715,978 B1 | * | 5/2010 | Wenger | G01C 23/00 340/977 |
| 7,792,607 B2 | * | 9/2010 | Han | A01B 69/001 340/988 |
| 7,941,133 B2 | * | 5/2011 | Aaron | G06Q 10/109 379/201.06 |

(Continued)

OTHER PUBLICATIONS

Federal Aviation Administration Aeronautical Information Manual (AIM) Official Guide to Basic Flight Information and ATC Procedures, dated Feb. 11, 2010, retrieved from the internet at: http://tfmlearning.faa.gov/Publications/atpubs/AIM/ on May 19, 2015, 714 pages.

*Primary Examiner* — Courtney D Heinle
(74) *Attorney, Agent, or Firm* — Donna P. Suchy; Daniel M. Barbieri

(57) ABSTRACT

An apparatus monitors position for an aircraft. The aircraft includes a display, a position system, a vision system and a database comprising terrain data associated with an environment at a location of the aircraft. The apparatus includes a monitoring processor configured to perform character recognition or structure recognition on the image data to identify a structure or a character in the image data, correlate a position of the structure or character in the environment using a position from the position system and the terrain data, and cause the display to provide a confirmation in response to the position of the structure or character in the terrain data matches the position of the structure or character in the image data.

20 Claims, 7 Drawing Sheets

(56) References Cited

U.S. PATENT DOCUMENTS

| | | | | |
|---|---|---|---|---|
| 8,131,118 B1* | 3/2012 | Jing | G01C 21/20 | 382/305 |
| 8,509,488 B1* | 8/2013 | Enge | G01C 21/3623 | 382/106 |
| 8,581,748 B1* | 11/2013 | Barber | G01C 23/005 | 340/971 |
| 8,831,798 B1* | 9/2014 | Barber | G01C 23/00 | 340/945 |
| 9,176,324 B1* | 11/2015 | Scherer | G02B 27/01 | |
| 9,189,964 B1* | 11/2015 | Rathinam | G08G 5/065 | |
| 9,347,794 B1* | 5/2016 | Tiana | G01C 23/00 | |
| 2005/0125142 A1* | 6/2005 | Yamane | G01C 11/00 | 701/510 |
| 2005/0182518 A1* | 8/2005 | Karlsson | G05D 1/0246 | 700/253 |
| 2007/0171094 A1* | 7/2007 | Alter | G01C 23/00 | 340/970 |
| 2007/0276590 A1* | 11/2007 | Leonard | G01C 21/005 | 701/468 |
| 2008/0039120 A1* | 2/2008 | Gad | G01C 21/20 | 455/456.2 |
| 2008/0154495 A1* | 6/2008 | Breed | G01C 21/20 | 701/472 |
| 2009/0228204 A1* | 9/2009 | Zavoli | G01C 21/30 | 701/532 |
| 2010/0070173 A1* | 3/2010 | Sakamoto | G01C 21/20 | 701/533 |
| 2010/0092034 A1* | 4/2010 | Arnaud | G06K 9/3216 | 382/103 |
| 2010/0176987 A1* | 7/2010 | Hoshizaki | G01S 19/48 | 342/357.23 |
| 2010/0208057 A1* | 8/2010 | Meier | G06T 19/006 | 348/135 |
| 2010/0331010 A1* | 12/2010 | Ische | G01S 5/0257 | 455/456.1 |
| 2011/0064312 A1* | 3/2011 | Janky | G01C 15/00 | 382/195 |
| 2011/0257873 A1* | 10/2011 | Lussiez | G06K 9/00791 | 701/120 |
| 2011/0282580 A1* | 11/2011 | Mohan | G01C 21/005 | 701/472 |
| 2012/0197519 A1* | 8/2012 | Richardson | G01C 21/20 | 701/408 |
| 2012/0300020 A1* | 11/2012 | Arth | G06T 7/75 | 348/36 |
| 2013/0045751 A1* | 2/2013 | Chao | G01C 21/206 | 455/456.1 |
| 2013/0050485 A1* | 2/2013 | Tiana | H04N 7/18 | 348/144 |
| 2013/0101163 A1* | 4/2013 | Gupta | G06K 9/00671 | 382/103 |
| 2013/0141565 A1* | 6/2013 | Ling | H04N 7/18 | 348/135 |
| 2013/0157682 A1* | 6/2013 | Ling | H04W 4/043 | 455/456.1 |
| 2013/0182891 A1* | 7/2013 | Ling | G06F 17/30241 | 382/103 |
| 2013/0297198 A1* | 11/2013 | Vande Velde | G01C 21/28 | 701/409 |
| 2014/0257688 A1* | 9/2014 | Chao | G01C 21/206 | 701/446 |
| 2015/0072707 A1* | 3/2015 | Pang | G01C 21/20 | 455/456.1 |
| 2015/0329217 A1* | 11/2015 | Kirk | B64D 45/00 | 701/301 |
| 2016/0104384 A1* | 4/2016 | Hanel | G01S 13/02 | 701/17 |

* cited by examiner

AIRCRAFT POSITION MONITORING SYSTEM AND METHOD

BACKGROUND

The present disclosure relates generally to the field of position monitoring. Position monitoring is important to many applications, including but not limited to operation or control of aircraft or other vehicles.

Position monitoring and display of position can assist pilots and other users by providing decision support and other assistance. For example, a map showing current aircraft location can assist the pilot in making operational decisions while traveling on an airport surface. Global positioning systems (GPS) are available for determining locations of vehicles and are combined with displays to provide a moving map view for the vehicle. Accurate position sensing and correlation of the position to the map view assists the operator or pilot in making safe vehicle (e.g., aircraft) movements and reducing the likelihood of a potential collision. Positioning systems, such as, GPS systems, and databases for the map view can be inaccurate at times. In aircraft applications, digital moving map (DMM) positioning can be unreliable due to positioning signal interference caused by GPS signal reflection/multipath from large taxiing aircraft or other structures at the airport. DMM positioning can also be unreliable due to poisoning signal interference caused by jamming in uncontrolled environments.

There is a need for a position monitoring system and method that cross checks position measurements from one or more systems to increase confidence in the position determination. There is also a need for a system and method that compares position as sensed by a positioning system to a database of the environment, (e.g., electronic charts) to ensure accurate correlation of the position and the chart. There is also a need to provide feedback to a pilot that the position and map view functions are accurate. There is further a need for system and method for use with airport layouts and taxiways operations that displays an environment view correlated with confirmed position. There is further a need for system and method for use with airport layouts and taxiways operations that senses the environment in real time and correlates a sensed position with a view of the environment. There is also a need for fusing data from an enhanced vision system with a map to cross-check a position estimate. There is also a need for a low cost, efficient, light weight system and method for determining and confirming position.

SUMMARY

In one aspect, the inventive concepts disclosed herein are directed to an apparatus that monitors position for an aircraft. The aircraft includes a display, a position system, a vision system and a database comprising terrain data (e.g., elevation data, topology data, map data, obstacle data, or signage data, etc.) associated with an environment at a location of the aircraft. The apparatus includes a monitoring processor configured to receive image data from the vision system associated with an environment of the aircraft, perform character recognition or structure recognition on the image data to identify a structure or a character in the image data, correlate a position of the structure or character in the environment using a position from the position system and the terrain data, and cause the display to provide a confirmation in response to the position of the structure or character in the terrain data matching the position of the structure or character in the image data. The confirmation can be provided on a moving map view on the display.

In another aspect, the inventive concepts disclosed herein are directed to a method of monitoring position of an aircraft on an airport surface. The method includes receiving image data associated with an environment of the aircraft, and correlating a position of a structure or character in the environment and a position of the structure or character in the terrain data. The method also includes confirming when the position of the structure or character in the terrain data matches the position of the structure or character in the image data.

In yet another aspect, the inventive concepts disclosed herein are directed to a system for providing information in an aircraft environment. The system includes a real-time sensor interface for receiving image data associated with an environment of an aircraft, and a database for providing airport data associated with an airport layout. The system also includes a processor for confirming a location of a symbol or structure in the environment of the airport using the image data, the airport data and a position of the aircraft. The system also includes a display for providing an indication of a confirmed location of the symbol or structure.

BRIEF DESCRIPTION OF THE DRAWINGS

Exemplary embodiments are described below with reference to the accompanying drawings, wherein like numerals indicate like elements, and wherein.

DETAILED DESCRIPTION OF THE PREFERRED EMBODIMENTS

A position monitoring system is configured to provide reliable confirmation of vehicle (e.g., aircraft) position at all times, thereby allowing safer operations in low visibility conditions. As various types of positioning systems can be unreliable at times, a data-fused system and method cross-checks position and provides feedback to the operator (e.g., a pilot) in some embodiments. In some embodiments, equipment available in the aircraft can be configured to confirm position and provide feedback without significant additional equipment or sensors.

The position monitoring system can correlate information extracted from enhanced vision system (EVS or EFVS) images and an ownship position sensor to an electronic chart, terrain data or a map in some embodiments. EFVS information is sensed in real time via a real time sensor interface as one channel of up-to-date information regarding the environment in some embodiments. In some embodiments, the information can be compared to information from other aircraft sensors, traffic collision avoidance systems (TCAS), an incursion detector, global positioning system (GPS) receivers, inertial navigation systems (INS), etc. to locate the aircraft or other vehicle on a map display (e.g., a digital moving map).

Figure 1:
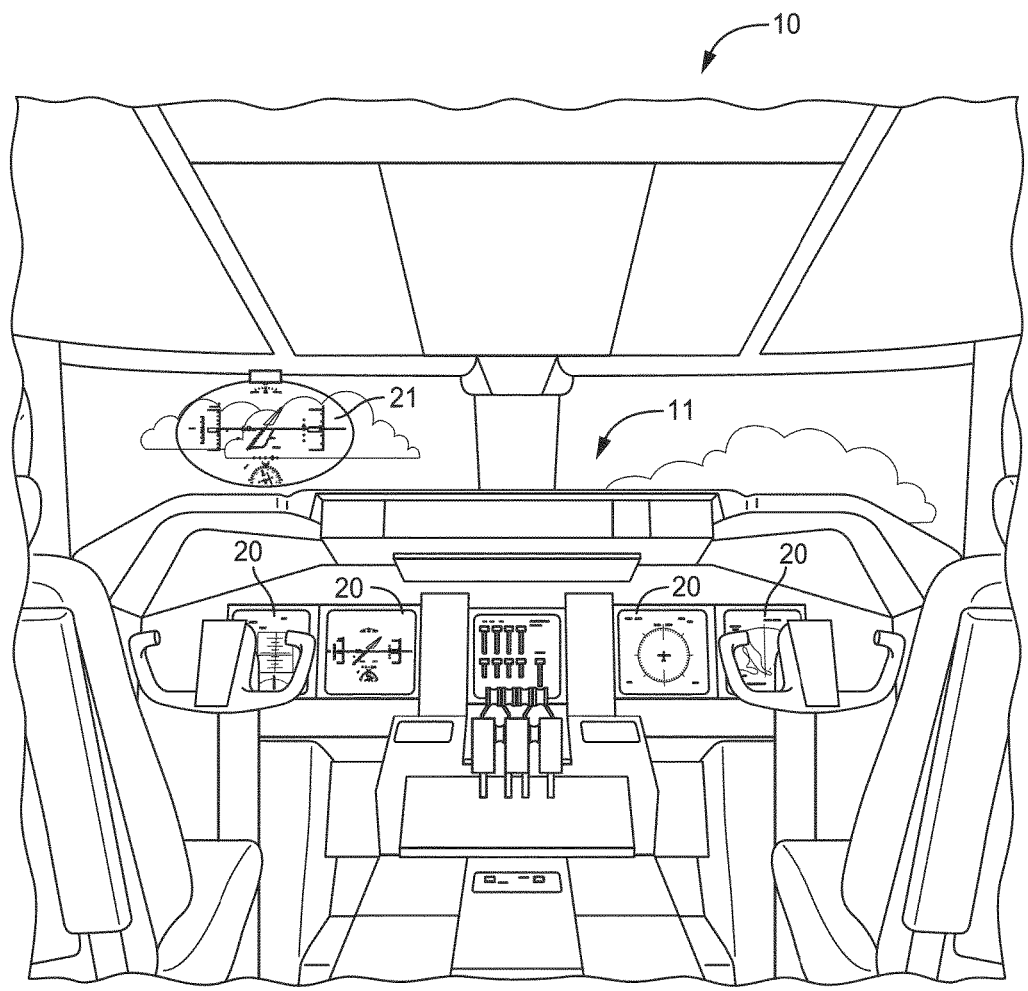
FIG. 1 is a schematic illustration of an aircraft control center or cockpit, according to an exemplary embodiment.

With reference to FIG. 1, an aircraft 10 includes a cockpit or an aircraft control center 11. Aircraft control center includes flight displays 20 embodied as head down displays (HDDs). Aircraft control center 11 can also include a combiner 21 associated with a head up display (HUD) system. In one embodiment, combiner 21 is provided as part of a wearable HUD. Conformal images are provided on combiner 21. Embodiments are described below with respect to an aircraft; however, the invention is not limited to uses in aircraft and can be used in other types of vehicles and other applications where position monitoring provides a benefit.

Flight displays 20 can be used to provide information to the flight crew, thereby increasing visual range and enhancing decision-making abilities. In an exemplary embodiment, flight displays 20 and combiner 21 can include a weather display, a map display, a weather radar map and a terrain display. Further, flight displays 20 and combiner can include a moving map, a synthetic vision system (SVS) image or an enhanced vision system (EVS) image (e.g., an enhanced flight vision system (EFVS) image) or a merged image derived from the SVS image and the EVS image in some embodiments. For example, flight displays 20 and combiner 21 can be configured to display a three dimensional or perspective image of terrain and/or weather information. Other views of terrain and/or weather information may also be provided (e.g., plan view, horizontal view, vertical view, or combinations thereof). Additionally, flight displays 20 and combiner 21 can be implemented using any of a variety of display technologies, including CRT, LCD, organic LED, dot matrix display, and others.

According to some exemplary embodiments, at least one of displays 20 or combiner 21 is configured to provide an image of the environment associated with aircraft 10 (e.g., while taxiing). In some embodiments, at least one of displays 20 or combiner 21 displays position monitoring symbols to indicate correlation between position and a map.

Figure 2:
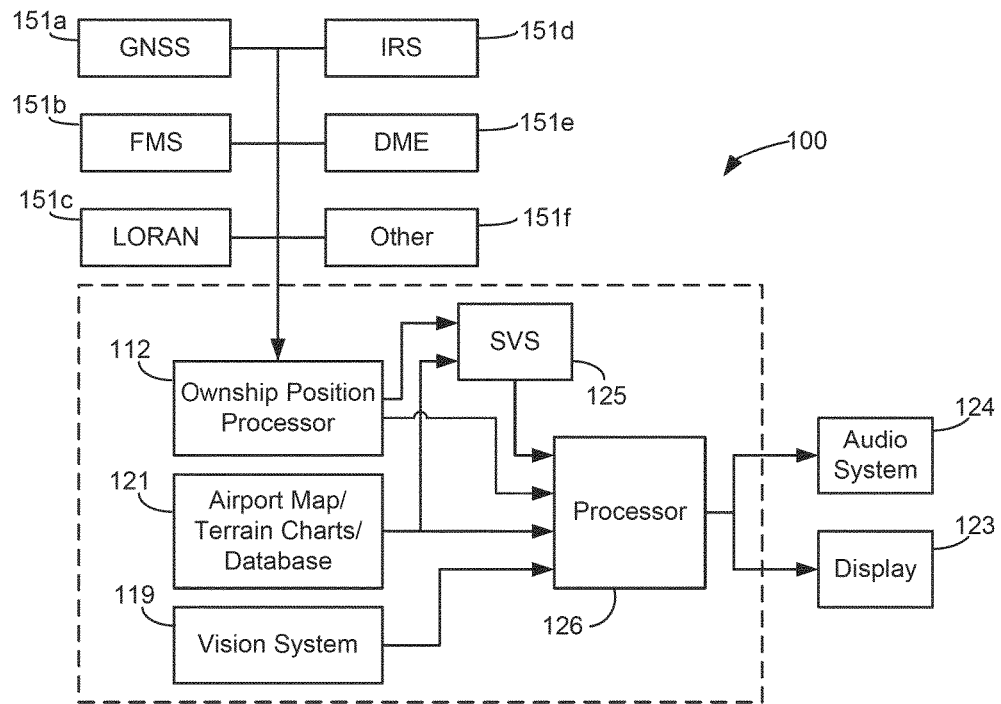
FIG. 2 is a general block diagram of a position monitoring system including a display processor for use in the aircraft control center illustrated in FIG. 1, according to an exemplary embodiment.

Referring to FIG. 2, a position monitoring system 100 is configured to detect a position and provide an alert when a sensed position is not correlated with a terrain database or map or provide a confirmation when a sensed position is correlated with a terrain database or map. Position monitoring system 100 generally includes an ownship position processor 112, a vision system (VS) 119 (e.g., an enhanced vision system), an airport/chart terrain database 121, a display 123, an audio system 124, a synthetic vision system (SVS) 125 and a processor 126. Position monitoring system 100 can be implemented in software for execution on a computing platform, such as an aviation computing resource (e.g., a traffic computer, surveillance system, integrated avionics module, common computer module, EVS), a general purpose processor, an electronic flight bag, or a portable device. In some embodiments, system 100 advantageously receives information from a variety of sources including infrastructure based sources, real-time sensors, airport databases, ownship location systems, ownship state determination systems, data link information, etc. and applies airport specific operational and alerting rules to generate alerts and/or advisories. In one preferred embodiment, the alerts are displayed on a map showing an airport layout.

Ownship position processor 112 is configured to collect and/or process data from available sensors to compute the ownship state. Ownship state can be determined using at least one of position, velocity, acceleration, time, altitude, heading, vehicle size, systems status, phase of operation, etc. The sensors may include one or more Global Navigation Satellite System (GNSS) receivers 151a, Flight Management Systems (FMS) 15 lb, LOng RAnge Navigation (LO-RAN) systems 151c, Inertial Reference Systems (IRS) 151d, Distance Measuring Equipment (DME) systems 151e, or other systems 151f that are used to determine ownship state, including any combination thereof. GNSS systems are meant to encompass at least one satellite constellation-type system (e.g., Global Positioning System (GPS), Global Navigation Satellite System (GLONASS), Galileo, etc.), and may also include one or more augmentation system (e.g., Satellite Based Augmentation System (SBAS), Ground Based Augmentation System (GBAS), Ground-based Regional Augmentation System (GRAS)). Ownship position processor 112 may also receive ownship information from a Traffic Information Services-Broadcast (TIS-B). Ownship position processor 112 is configured to process the available ownship intent data, ownship clearance data, and other relevant prediction information to determine position. In some embodiments, ownship position processor 112 determines position from GNSS receiver 151a embodied as a GPS receiver and other position sensors and provides an indication of position to processor 126. Ownship position processor 112 can use data from redundant sensors and multiple sources to provide a position signal that is more reliable than a position signal from a single sensor. Ownship processor 112 can provide the position signal to SVS 125 and processor 126.

In some embodiments, processor 126 receives information regarding traffic from other aircraft, ground vehicles, and ground systems to compute traffic states that may include position, velocity, acceleration, time, altitude, heading, aircraft/vehicle size, systems status, phase of operation, etc. Traffic data may be obtained from broadcast mechanisms, such as, TIS-B, Automatic Dependent Surveillance-Broadcast (ADS-B), and Automatic Dependent Surveillance-Rebroadcast (ADS-R), or via Traffic Alert and Collision Avoidance System (TCAS) or any combination thereof. The information regarding traffic can be used compute location and/or size of obstacles on or near a runway. The information regarding traffic can be data from a number of sensors including a weather radar (WxR) system, an optical camera system (e.g., a television camera), a millimeter-wave radar system, an acoustic system, a LIght Detection and Ranging (LIDAR) system, a Forward Looking Infrared Radar (FLIR), an obstacle database, or any combination thereof. The obstacle database may be part of database 121, data loaded from a storage media, manually entered, and/or received via wireless data link (e.g., TIS-B). The information can be provided to processor 126 to display traffic on display 123, and provide an incursion warning on display 123 or audio system 124.

Processor 126 is in communication with VS 119 (e.g., an EFVS) and SVS 125 in some embodiments. SVS 125 is optional in some embodiments. In some embodiments, VS 119 is an enhanced vision system manufactured by Rockwell Collins (e.g., an EVS-3000 system) or a suitable alternative. In some embodiments, SVS 125 is a synthetic vision system manufactured by Rockwell Collins (e.g., a Pro Line Fusion® system) or a suitable alternative.

In some embodiments, processor 126 is a graphics processor or other computing platform configured to receive image data from VS 119, position data from ownship position processor 112, and terrain or map data from database 121. Processor 126 can be any type of computer, digital signal process, graphics processor, computing device, or combination thereof. Processor 126 is configured to provide an image on display 123 (e.g., one or more of displays 20 or combiner 21). The image includes an indication of correlation of position to the map data based upon a comparison of the position information from processor 112, the image data from VS 119, and the map data.

Airports/charts database 121 is a memory or other storage device for storing at least one of airport charts, terrain data, signage data, obstacle data, airport rules, etc. Airports/charts database 121 can be configured to receive periodic downloads of information in some embodiments. According to some embodiments, airport charts/database 121 may be resident on aircraft 10, while in another exemplary embodiment, airport charts/database 121 may be loaded on to the aircraft 10 (e.g., via wireless or wired transmission).

Advantageously, position monitoring system 100 increases pilot situational awareness since it provides the pilot the ability to readily correlate the two streams of information (possibly presented on separate displays, e.g. displays 20 and combiner 21 (FIG. 1)) with corresponding features in some embodiments.

According to some embodiments, position monitoring system 100 can alert or can provide confirmation of the positions of at least one or more of the following representations on a perspective view or moving map display:

1. Runway signage and runaway and taxiway identification markers;
2. Runway-to-use and relevant hold-short lines; the lines may be highlighted, if available.
3. Airport structures, buildings, gates, jet ways, towers, etc.;
4. Traffic position for all traffic within a pre-defined, user selectable, or automated range or region;
5. Obstacles.
6. Intended ownship airport surface movement route information (including pushback, taxi, takeoff, and/or landing runway and taxi) may be displayed, if available. Clearance information, e.g., highlighting the portion of the taxi route for which the aircraft is cleared to move without receiving a subsequent clearance, may be displayed, if available.
7. One or more intended traffic taxi route information may be displayed, if available. Clearance information, e.g., highlighting the portion of the taxi route for which the traffic is cleared to move without receiving a subsequent clearance, may be displayed, if available.

Figure 3:
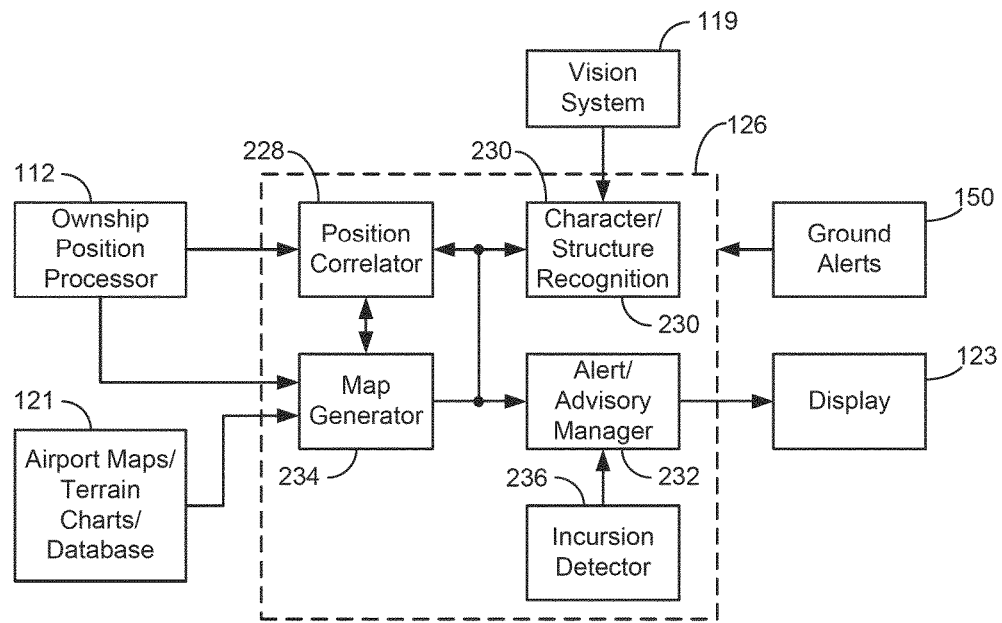
FIG. 3 is a more detailed block diagram of the display processor for the position monitoring system of FIG. 2, according to an exemplary embodiment.

With reference to FIG. 3, processor 126 includes a position correlator module 228, a character or structure recognition module 230, an alert advisory manager module 232, a map generator module 234, and an incursion detector module 236. Position correlator module 228, character or structure recognition module 230, alert advisory manager module 232, map generator module 234, and incursion detector module 236 can be embodied as software modules operating on a computing platform or processor 126 and can be stored on a non-transitory medium. Processor 126 can be part of, or integrated with, a radar system, SVS 125, VS 119, a HDD display computer for displays 20 (FIG. 1), or a HUD computer for combiner 21 in some embodiments. In one embodiment, processor 126 is an independent platform.

Character and structure recognition module 230 receives image data from VS 119 and uses character recognition to identity text on surface runway markers or signage or edge processing to identify particular structures. The text or structures can be referenced to a data base of texts or structures for the particular airport in some embodiments. The data base can also include a location component so text or structures in the most immediate area for aircraft 10 can be searched for first. The data base can be part of airport charts database 121 or part of module 230 in some embodiments.

In some embodiments, imagery or image data from VS 119 is analyzed for relevant features. In some embodiments, VS 119 can detect airfield features at night and in low visibility conditions before the aircrew can see them. The airfield features can be part of digital moving map information from database 121 or SVS 125.

Characters and structures are identified by scanning the image data from VS 119 in some embodiments. In some embodiments, data (e.g., hints or expected texts or shapes from a digital moving map) from map generator module 234 can be used to identify the relevant features. For example, a runway surface and its surrounding terrain can be identified in the image data. Any exception to the runway surface or terrain appearance can be processed as signage, which can be read and interpreted with iconic information presented to the pilot via map generator module 234 and alert/advisory manager module 232. Large exceptions to the terrain appearance can be processed as a structure, which can be read and interpreted with iconic information presented to the pilot via map generator module 234 and alert/advisory manager module 232. The position of airfield signage is predictable and specified (e.g., see Federal Aviation Administration Aeronautical Information Manual Official Guide to basic Flight Information and ATC Procedures). The position of structures is predictable and specified in airport charts and obstacle databases.

Segmentation of the pavement and the surrounding terrain in the airport area eases the detection of exceptions to the pavement appearance. Objects, such as, other aircraft, are detected against the runway upon which it is taxiing in some embodiments. For an infrared camera in VS 119, the pavement is thermally dark while the other aircraft is thermally bright and can be highlighted in the EVS image and on a digital moving map.

Signage detected in the image data can be outlined for emphasis and left to pilot interpretation, or electronically read (e.g., using optical character recognition) and presented symbolically with greater clarity than supported by local visibility conditions in some embodiments. Detected signage can be highlighted on an image from VS 119 provided on display 123 and correlated to a moving map view on display 123. Airfield features extracted from image data for VS 119 can be similarly correlated with known features of the airfield as presented on a ground-taxi map (e.g., demonstrating the correlation of the airfield tower, a feature often marked on Jeppesen plates) in some embodiments.

Position correlator module 228 receives the position signal or data from ownship position processor 112 and character/structure recognition data from character/structure recognition module 230. Position correlator module 228 matches the character/structure recognition data with data from map generator module 234. Correlating imagery extracted from VS 119 and information from map generator module 234 delivers increased reliability and certifiability for both streams of data.

Position correlator module 228 compares a position derived from the character/structure recognition data derived from image data from VS 119 to a position derived from ownship position processor 112 and data from map generator module 234 (e.g., data from or derived from chart data, terrain data, map data, etc. from airport charts database 121 in some embodiments).

In some embodiments, position correlator module 228 compares the location derived from the image data of markers or signage to the location of such markings or signage as provided in airport/charts data base 121. The locations are compared by comparing relative location to aircraft 10 using the position signal or data and converting the location derived from airport charts database 121 to a relative position or by comparing absolute location using the absolute location in the airport/charts database 121 and position signal and converting the relative location derived from VS 119 to an absolute location in some embodiments. The location of signage or other features relative to aircraft 10 can be readily derived from the image data from VS 119 which is carefully bore sighted to aircraft 10. Thus, a sign or other feature is known to be at a certain elevation and azimuth relative to aircraft bore sight, and with knowledge of altitude (e.g. 0 if on the ground, or as reported in other cases) the feature is geolocated in some embodiments. A position correlation signal or data is provided to alert/advisory manager module 232. In some embodiments, the position of other aircraft as provided by traffic data (e.g., ADS-B, ADS-R, or TCAS) is correlated with the detected position and an indication of the correlation is provided in the display of the image from VS 119 or SVS 125 and/or on a moving map on display 123.

Map generator module 234 is configured to process airport charts data from airports/charts database 121 (FIG. 2) to provide a perspective display, moving map display, or both for the airport surface. Map generator module 234 can compute the centerline, width, end points, length, and/or direction of each runway and/or taxiway of the airport and provide representations of structures. Map generator module 234 may also compute the available hold-lines of each runway or taxiway. Map generator module 234 receives the position data or signal from ownship position processor or position correlator module 228 and uses the position signal to select the appropriate area and view of the airport surface and to provide an aircraft symbol on display 123.

Alert advisory manager module 232 receives data from position correlator module 228, character or structure recognition module 230, map generator module 234, and incursion detector module 236 to provide confirmation of position with respect to structures, traffic, and signage. When position of structures, traffic, and signage is correlated with position from correlator and data used by map generator module 234 or from incursion detector module, the structures, traffic, and signage can be highlighted, circled, marked with a symbol (e.g., a check mark), marked with text, etc. in some embodiments. Alert advisory manger 232 processes ownship, target, and airport data to compute and prioritize alerts and advisories for the aircraft crew in some embodiments.

Incursion detector module 236 utilizes traffic data to determine potential incursions and provide a warning to display 123 via alert/advisory manager module 232.

Figure 4:
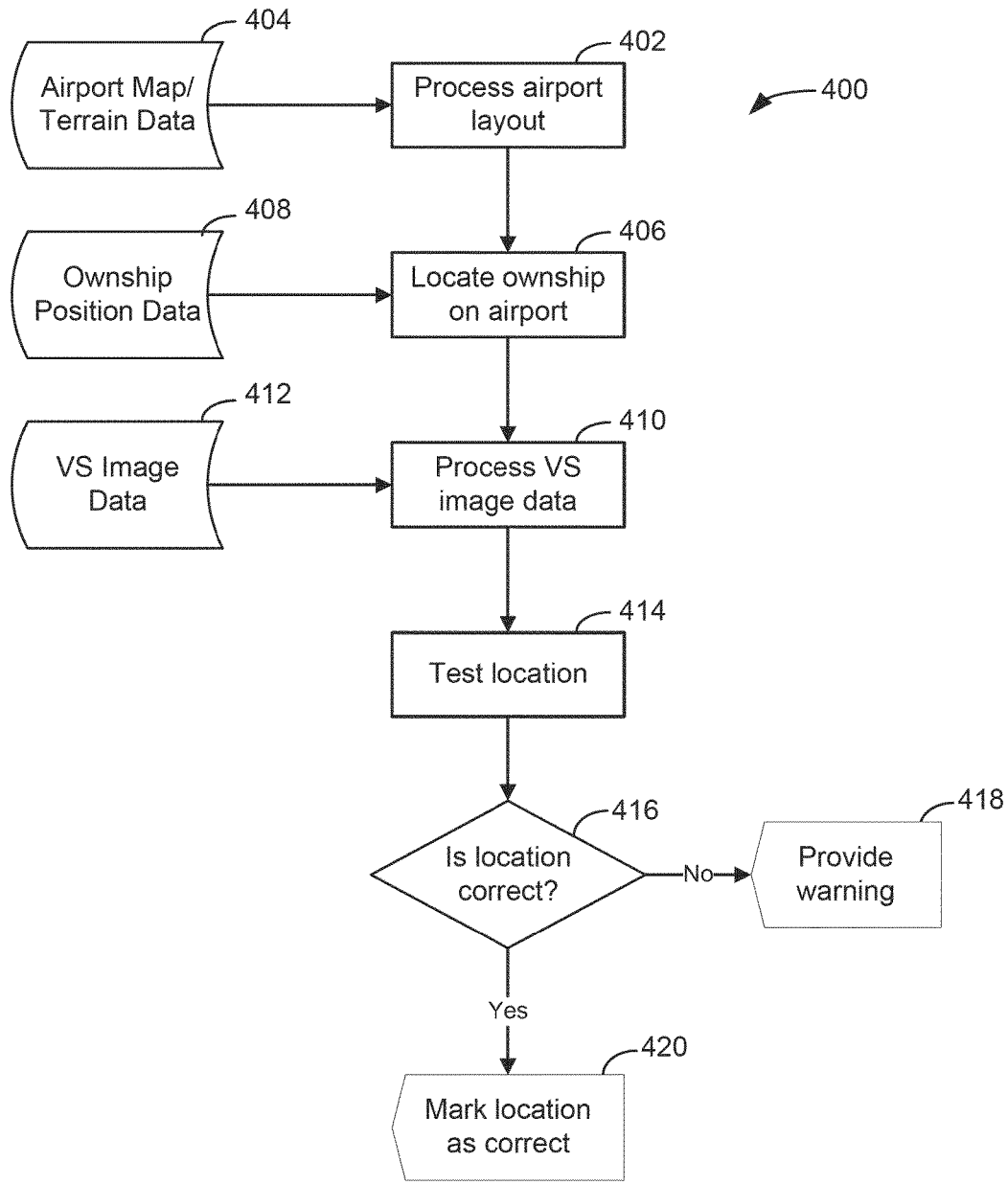
FIG. 4 is a process flow diagram that illustrates operation of the position monitoring system illustrated in FIG. 2, according to an exemplary embodiment.

With reference to FIG. 4, position monitoring system 100 operates according to flow 400 in some embodiments. At an operation 402, the airport layout is processed using airport map/terrain data 404 retrieved from an airport charts database 121 (FIG. 2) by map generator module 234 (FIG. 3). The runway/taxiway layout and boundaries may be processed for one or more airports. For example, data related to airport monitoring accuracy, signage, obstacles, structures, intersections and hold-lines for each runway and taxiway may be computed for display on display 123 (FIG. 2).

At an operation 406, ownship position processor 112 (FIG. 2) provides a position data 408 for aircraft 10. The position data can include geo-located position, aircraft altitude, aircraft attitude, aircraft elevation angle, etc. At an operation 410, image data 412 from VS 119 is processed by character/structure recognition module 230 to identify signage, markings, or structure in the environment of aircraft 10 at a relative location with respect to aircraft 10.

At an operation 414, alert/advisory manager module 232 (FIG. 3) determines if the location of signage, structures, or markings are correlated with the airport map/terrain data 404 associated with airport chart database 121 (FIG. 2) or map generator module 234 (FIG. 3). If not, a warning is provided at an operation 418 in some embodiments. If so, the signage, structure or marking are marked with a symbol, text, a highlight or other delineation to indicate proper location correlation. After operations 418 and 420, flow 400 can return to operation 406. In some embodiments, the location of targets in the image data are tested at operation 414 for correlation with location data for the targets from other systems (e.g., ADS-B, TCAS, etc.) and the appropriate warning or marking is provided at operations 418 and 420.

Position monitoring system 100 (FIG. 2) processes operational and alerting rules received and determines whether the ownship and targets are in conformance with those rules in some embodiments. The operational and alerting rules may be particular to a specific airport or to a set of airports, and/or to the currently active airport configuration. The ownship conformance to the operational and alerting rules may be monitored (e.g., has the ownship violated any taxiway/runway boundaries, hold-lines, clearance instructions, attempting to land or take off from a runway that is not appropriate for ownship takeoff or landing, or approaching an area (e.g., closed taxiway) that is not appropriate for use) based on information contained in the airport charts/database (e.g., runway/taxiway boundaries), ownship current and predicted future states, clearances, etc. If an ownship conformance rule is violated, an ownship conformance alert may be generated. Target's conformance to the operational and alerting rules may be monitored based on information contained in the airport charts/database, the target's current and predicted states, clearances, etc. If traffic violates an operational conformance rule, a traffic conformance alert may be generated. Applicable alerts are generated and output to display 123 in some embodiments.

Figure 5:
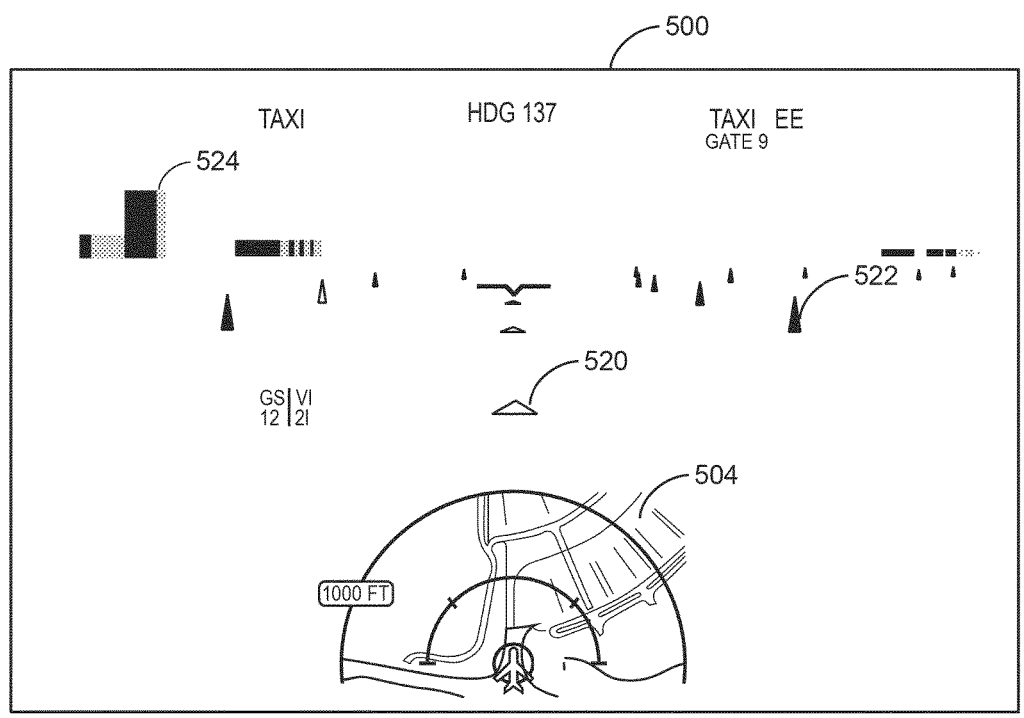
FIG. 5 is a drawing of a display screen showing a map view and a perspective view for the position monitoring system illustrated in FIG. 2, according to an exemplary embodiment.

With reference to FIG. 5, a screen shot 500 of information provided on display 123 (FIG. 2) is shown. Screen shot 500 provides an egocentric view for a HUD in one embodiment. Image objects are created by SVS 125 (FIG. 2) and overlay an EFVS image (not shown in FIG. 5) in some embodiments. Screen shot 500 includes a perspective view 502 of an environment of aircraft 10 and a moving map display 504. Perspective view 502 is an image derived from image data from SVS 125 or VS 119 (FIG. 2) or a merged image derived from image data from SVS 125 and VS 119. Arrows 520 show a taxi route (e.g., to a gate) and can be provided by SVS 125. Cones 522 show a taxiway edges and can be provided by SVS 125. Moving map display 504 is a look down, scaled down version in some embodiments. Building 524 can be annotated or otherwise marked to show position correlation according to flow 400 or another process in some embodiments. In some embodiments, signage and markings on the taxiway can be annotated or otherwise marked to show position correlation according to flow 400 or another process. Moving map display 504 can show parking stands and the route associated with arrows 520.

Figure 6:
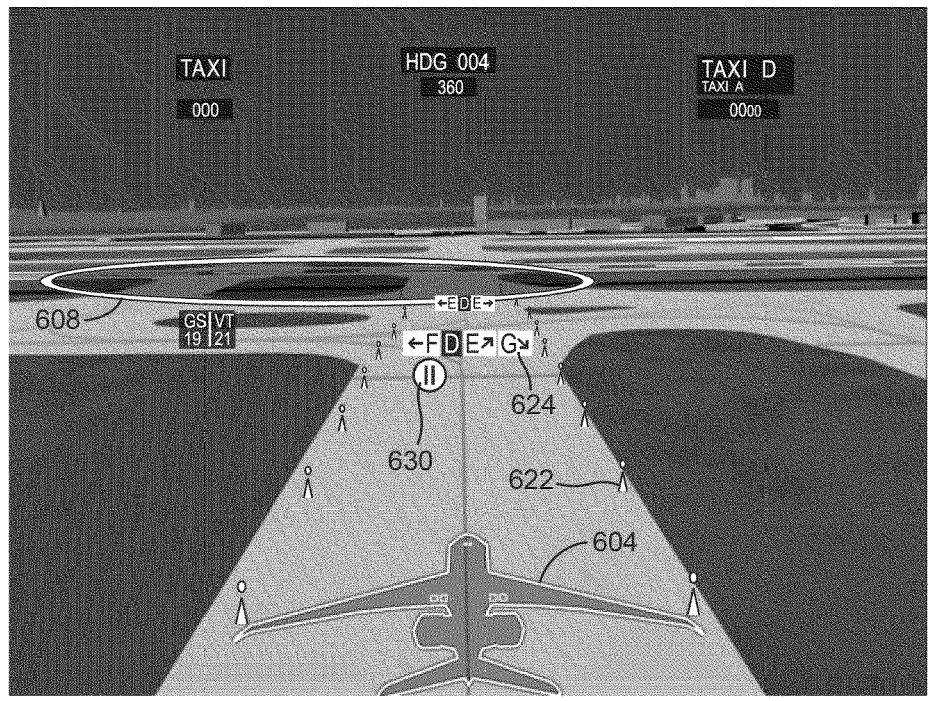
FIG. 6 is a drawing of a display screen showing a perspective view with a symbol for position correlation for the position monitoring system illustrated in FIG. 2, according to an exemplary embodiment.

With reference to FIG. 6, a screen shot 600 of information provided on display 123 is shown. Screen shot 600 provides an exocentric view for a HDD in one embodiment. Screen shot 600 includes a perspective view of an environment of aircraft 10. A symbol 604 of aircraft 10 (FIG. 1) is provided using the position data from ownship position processor 112. In some embodiments, screen shot 600 provides an over the shoulder view.

A symbol 608 (e.g., a circle) indicates a hot spot which is defined in airport/chart database 121 in some embodiments. Screen shot 600 is an image derived from image data from SVS 125. Cones 622 show a taxiway edges and can be provided by SVS 125. Taxiway markers 624 are marked with symbol 630 to show position correlation according to flow 400 or another process in some embodiments. In some embodiments, taxiway markers 624 with yellow text on black background (e.g., D) shows aircraft 10 is on taxiway D which is shown as confirmed by symbol 630. Black on yellow markers of taxiway markers 624 show directions to other taxiways. Text in screen shot 600 can represent taxiway location of aircraft 10, altitude, speed, direction of aircraft 10, distance to hold line, etc. in some embodiments.

Figure 7:
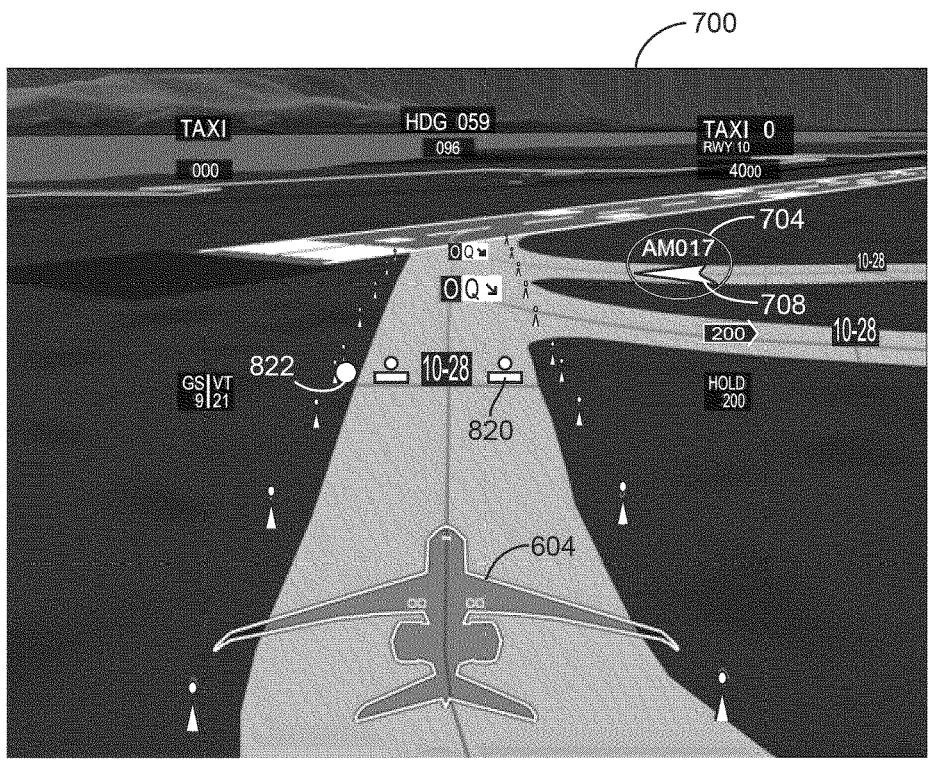
FIG. 7 is a drawing of a display screen showing a perspective view with a symbol for a hold line for the position monitoring system illustrated in FIG. 2, according to an exemplary embodiment.

With reference to FIG. 7, a screen shot 700 of information provided on display 123 is shown. Screen shot 700 includes an over the shoulder perspective view of an environment of aircraft 10 derived from image data from SVS 125. Symbol 604 of aircraft 10 (FIG. 1) is provided using the position data from ownship position processor 112. A symbol 708 indicates an aircraft or other object. Symbol 708 can be colored to represent threat level. A symbol 704 can be provided to indicate position correlation between the position of the other aircraft or object and the position as determined from the image data from VS 119 in some embodiments. A hold line 820 is shown in front of aircraft symbol 604 and can be marked with symbol 822 to show position correlation according to flow 400 or another process in some embodiments. Text in screen shot 700 can represent taxiway location of aircraft 10, altitude, speed, direction of aircraft, distance to hold line, etc. in some embodiments.

Figure 8:
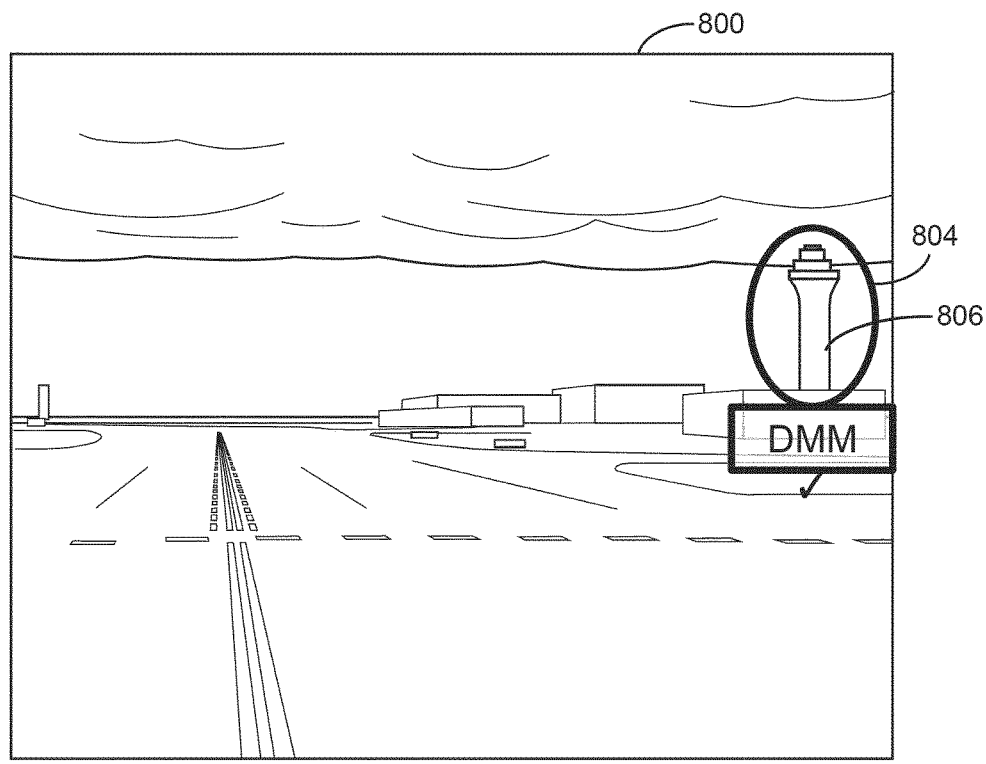
FIG. 8 is a drawing of a display screen showing a perspective view digital moving map with a tower position confirmation symbol for the position monitoring system illustrated in FIG. 2, according to an exemplary embodiment.

With reference to FIG. 8, a screen shot 800 of information provided on display 123 is shown. Screen shot 800 includes an EVS image of an environment of aircraft 10. Symbol 804 indicates tower 806 is correlated with the position of the tower on a moving map in some embodiments. In some embodiments, signage and markings on the taxiway can be annotated or otherwise marked to show position correlation according to flow 400 or another process.

Figure 9:
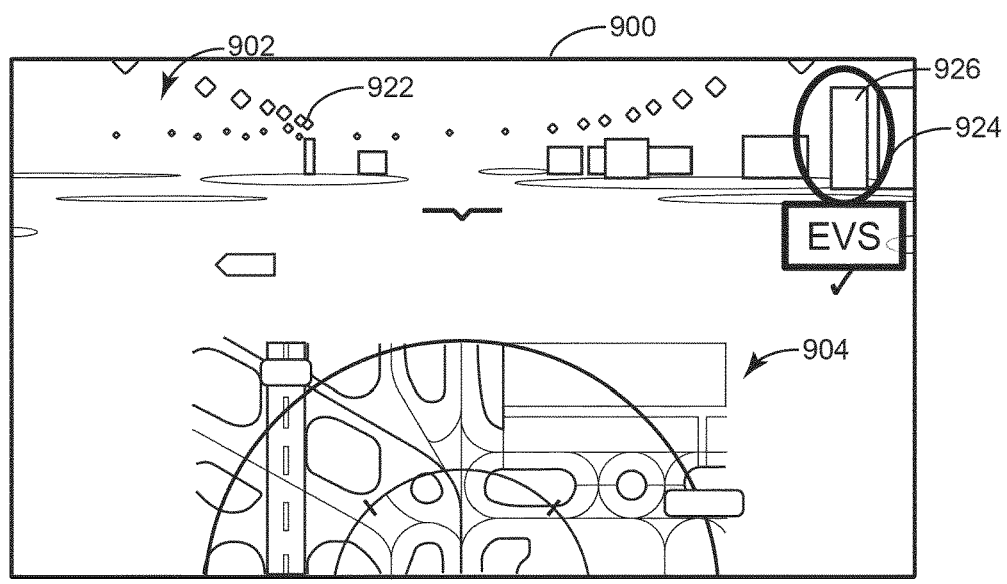
FIG. 9 is a drawing of a display screen showing a perspective view enhanced vision image and map view with tower position confirmation for the position monitoring system illustrated in FIG. 2, according to an exemplary embodiment.

With reference to FIG. 9, a screen shot 900 of information provided on display 123 is shown. Screen shot 900 includes a perspective view 902 of an environment of aircraft 10 and a moving map display 504. Perspective view 902 is a merged image derived from image data from SVS 125 and VS 119. Diamonds 922 show a taxi route (e.g., to a gate) and can be provided by SVS 125. Symbol 924 indicates tower 926 is correlated with the position of the tower on the EVS image in some embodiments.

Figure 10:
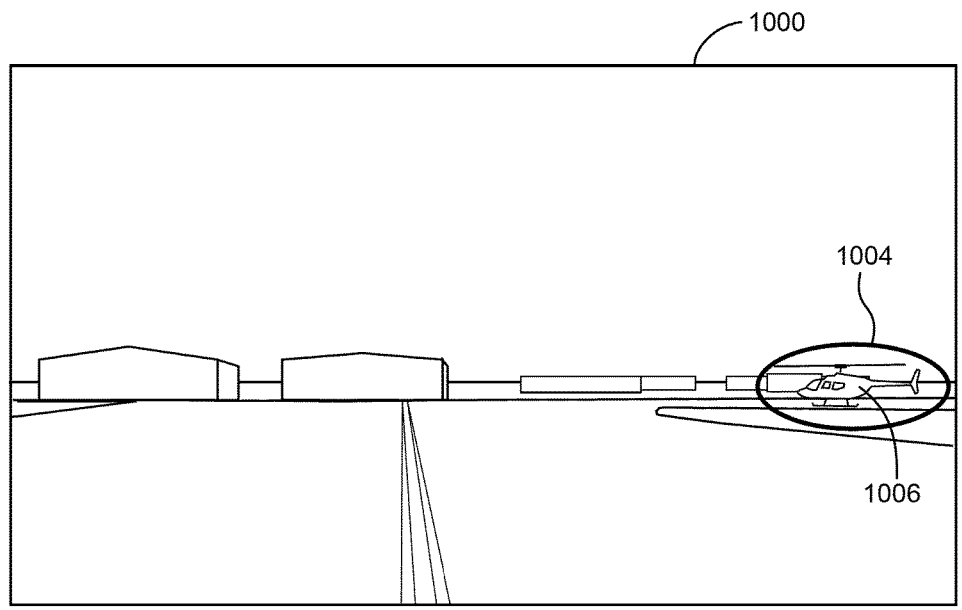
FIG. 10 is a drawing of a display screen showing a perspective view with a confirmed incursion alert for the position monitoring system illustrated in FIG. 2, according to an exemplary embodiment.

With reference to FIG. 10 a screen shot 1000 of information provided on display 123 is shown. Screen shot 1000 includes an EVS image of an environment of aircraft 10. A symbol 1004 can be provided to indicate position correlation between the position of helicopter 1006 and the position of helicopter 1006 as determined from the image data from VS 119 in some embodiments.

Figure 11:
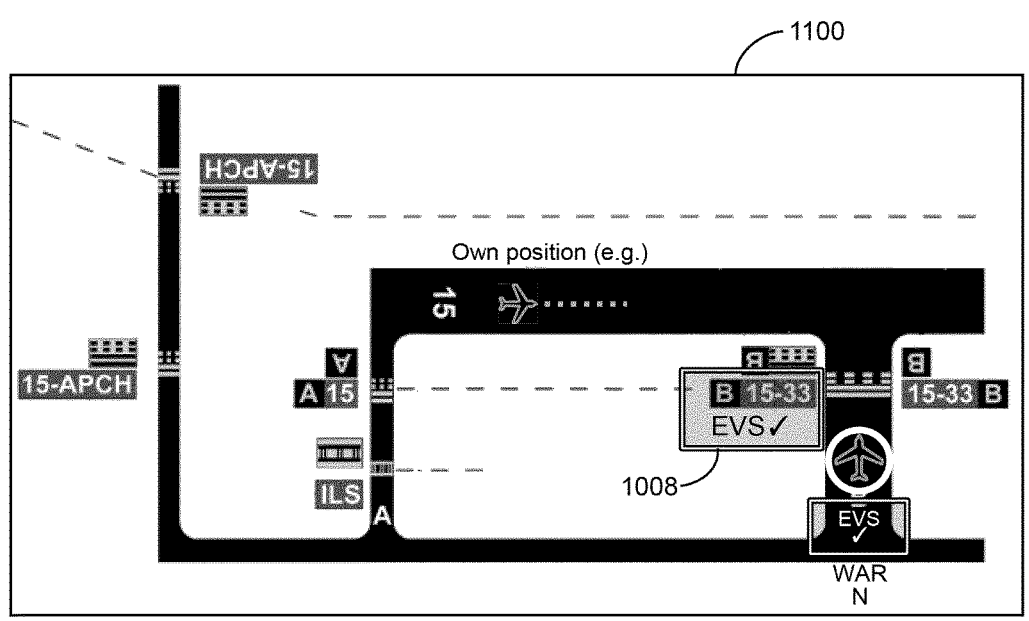
FIG. 11 is a drawing of a display screen showing a moving map for the position monitoring system illustrated in FIG. 2, according to an exemplary embodiment.

With reference to FIG. 11, a screen shot 1100 of information provided on display 123 is shown. Screen shot 1100 includes a digital moving map of an environment of aircraft 10. A symbol 1008 (e.g., a rectangle) indicates a position correlation at signage B 15-33 according to flow 400 in some embodiments. In some embodiments, text "EVS" indicates that the location of the signage in the EVS image matches the location of the signage on the digital moving map. In some embodiments, a corresponding EVS image is displayed with screen shot 1100 and text DMM on the EVS image indicates a correspondence between the map data and the EVS image. The correspondence can be associated with a location of signage, buildings, other vehicles, etc. Incursions and incursion location correlation for those incursions can also be shown on screen shot 1100 according to flow 400 or another process in some embodiments. In some embodiments, any of the markings shown in screen shot 1100 can be used as a marker for testing a correlation according to flow 400 or another process.

Screen shots 500, 600, 700, 800, 900, 1000, and 1100 can show multiple correlation symbols in some embodiments. In some embodiments, warnings of position correlation failures are provided as text or symbol warnings on any of screen shots 500, 600, 700, 800, 900, 1000, and 1100.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. In this application, the term real-time refers to performance of an activity in real time, pseudo real time, or actively in time for performance of an activity. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for monitoring position for an aircraft comprising a display, a position system, a vision system and a database comprising environment data associated with an environment at a location of the aircraft, the apparatus comprising:
   a monitoring processor configured to receive image data from the vision system associated with the environment of the aircraft, perform character recognition on the image data to identify text in the image data and use the text to correlate a position in the environment using a sensed position from the position system and the environment data, cause the display to provide an image using the image data with enhanced character display of the text on the display, and cause the display to provide a confirmation on a map view in response to the position in the environment matching an image position associated with the image data, wherein the monitoring processor is configured to correlate locations of targets in the image data with locations of the targets in traffic data from an automatic dependent surveillance-broadcast- B (ADS-B) or traffic collision avoidance (TCAS) system.

2. The apparatus of claim 1, wherein the text is provided on signage in the environment.

3. The apparatus of claim 1, wherein the vision system is an enhanced vision system.

4. The apparatus of claim 1, wherein the vision system is an infrared, radio frequency, or visual light image system.

5. The apparatus of claim 1, wherein the image data is video data.

6. The apparatus of claim 1, wherein the confirmation comprises a delineation.

7. The apparatus of claim 1, wherein the text is associated with a sign or runway marker.

8. The apparatus of claim 1, wherein the targets are other aircraft.

9. A system for providing information in an aircraft environment, the system comprising:
   a real-time sensor interface for receiving image data associated with an environment of an aircraft;
   a database for providing airport data associated with an airport layout associated with an airport; and
   a processor for identifying text in the image data and confirming a location associated with the text in the environment of the airport using the image data, the airport data and a position of the aircraft; and
   a display for providing an indication of a confirmed location of the text, wherein an enhanced version of the text is provided on the display, wherein the processor is configured to correlate locations of targets in the image data with locations of the targets in traffic data from an automatic dependent surveillance-broadcast (ADS-B) or traffic collision avoidance (TCAS) system.

10. The system of claim 9, wherein the processor utilizes character recognition to identify the text.

11. The system of claim 9, wherein the processor receives the position of the aircraft from a global positioning system receiver.

12. The system of claim 9, wherein the display comprises a moving map display with an egocentric display on a head up display or with an exocentric or egocentric display on a head down display.

13. An apparatus for an aircraft, comprising:
   a display;
   a position system;
   a vision system;
   a database comprising environment data associated with an environment at a location of the aircraft; and
   a processor configured to receive image data from the vision system associated with the environment of the aircraft, perform character recognition on the image data to identify text in the image data, and use the text to correlate a position in the environment using a position from the position system and the environment data, the processor configured to cause the display to provide a confirmation on a map view in response to the position in the environment matching an image position associated with the image data, wherein the processor is configured to correlate locations of targets in the image data with locations of the targets in traffic data from an automatic dependent surveillance-broadcast-B (ADS-B) or traffic collision avoidance (TCAS) system.

14. The apparatus of claim 13, wherein the text is provided on signage in the environment.

15. The apparatus of claim 13, wherein the vision system is an enhanced vision system.

16. The apparatus of claim 13, wherein the vision system is an infrared, radio frequency, or visual light image system.

17. The apparatus of claim 13, wherein the image data is video data.

18. The apparatus of claim 13, wherein the confirmation comprises delineation about the text.

19. The apparatus of claim 13, wherein the text is associated with a sign or runway marker.

20. The apparatus of claim 13, wherein the processor is configured to provide an enhanced version of the text on the display.

* * * * *